United States Patent [19]
Johnson et al.

[11] 3,910,330
[45] Oct. 7, 1975

[54] PORTABLE VINYL AUTO TOP COVER

[75] Inventors: Dennis A. Johnson; Samuel C. Johnson, both of Detroit, Mich.

[73] Assignee: The Raymond Lee Organization, Inc., New York, N.Y.; a part interest

[22] Filed: Feb. 4, 1974

[21] Appl. No.: 439,417

[52] U.S. Cl. .............................................. 150/52 K
[51] Int. Cl.² .......................................... B60J 11/00
[58] Field of Search........ 296/136, 137 R; 150/52 K

[56] References Cited
UNITED STATES PATENTS

| | | | |
|---|---|---|---|
| 3,175,859 | 3/1965 | Abodeely | 150/52 K X |
| 3,241,877 | 3/1966 | Le Voyd Tate | 150/52 K X |
| 3,763,908 | 10/1973 | Norman | 150/52 K |

Primary Examiner—Donald F. Norton
Attorney, Agent, or Firm—Howard I. Podell

[57] ABSTRACT

A portable vinyl plastic auto top cover which can be instantaneously installed or removed from the roof of an automobile. The vinyl auto top cover is held to the roof of the automobile by magnetic inlays mounted within the plastic cover. The auto top is also fitted with security hooks which fasten to the roof structure of the automobile.

3 Claims, 6 Drawing Figures

U.S. Patent  Oct. 7,1975  3,910,330
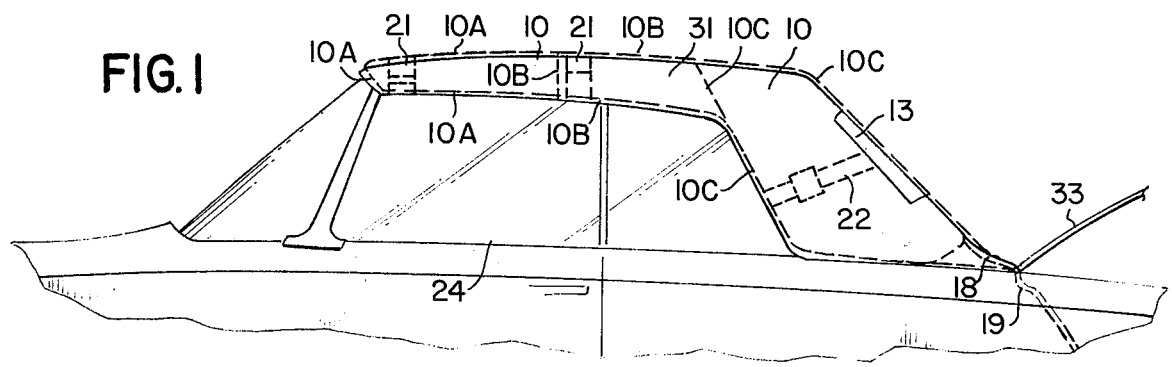
FIG.1
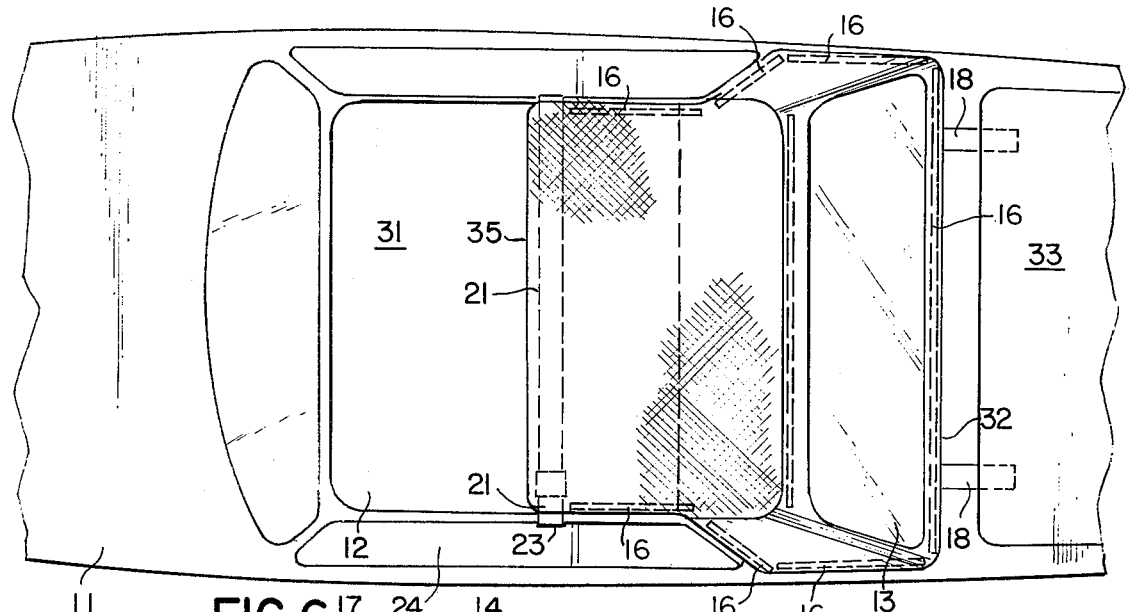
FIG. 2
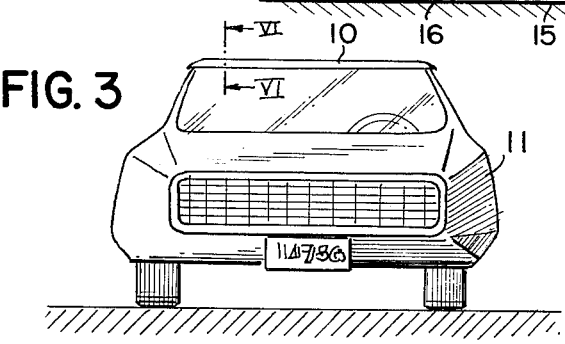
FIG. 3
FIG. 6
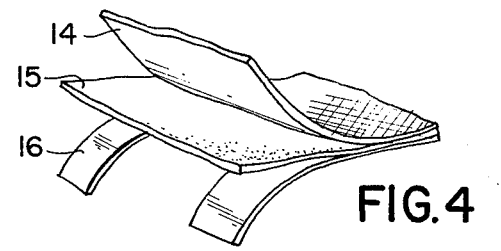
FIG.4
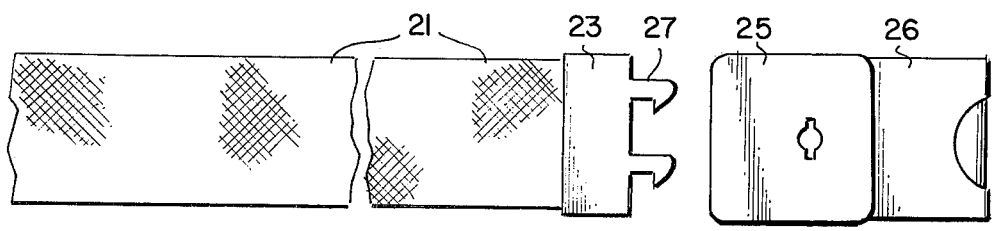
FIG.5

PORTABLE VINYL AUTO TOP COVER

SUMMARY OF THE INVENTION

My invention relates to a portable vinyl auto top cover which can be readily installed or removed from the exterior of the roof of an automobile. The vinyl auto top cover of my invention is held to the roof of the automobile by magnetic inlays fitted within the plastic cover which is also fitted with security hooks for fastening to the edges of the roof structure of the automobile.

An advantage of my invention is that an automobile may be readily fitted with a vinyl top cover.

BRIEF DESCRIPTION OF THE DRAWING

The objects and features of the invention may be understood with reference to the following detailed description of an illustrative embodiment of the invention, taken together with the accompanying drawing in which:

FIG. 1 illustrates a side view of the invention in use;

FIG. 2 illustrates a top view of the invention in use;

FIG. 3 illustrates a front view of the invention in use;

FIG. 4 illustrates a fragmentary exploded perspective view of the cover material;

FIG. 5 illustrates a top view of a cover security strap; and

FIG. 6 illustrates a sectional view of an alternative embodiment of the invention taken along line 6—6 of FIG. 3.

DESCRIPTION OF THE PREFERRED EMBODIMENT

Turning now descriptively to the drawing, in which similar reference characters denote similar elements throughout the several views, FIG. 1 shows a vinyl auto top cover 10 secured to a roof 31 of an automobile 11. Cover 10 may extend the full length of the auto top 31 as shown by dash lines 10A, or cover the rear half or rear quarter of the top of the automobile 11 as shown by dash lines 10B or 10C respectively. As shown in FIG. 4, the vinyl auto top cover sheet is formed of a top sheet of embossed vinyl 14 bonded to a backing of foam, felt or cotton 15 which is secured to a magnetic tape 16 that is fastened to the underside of the backing 15 along the perimeter of the cover 10. Alternately, as shown in FIG. 6, the magnetic tape 16 may be directly bonded to the underside of vinyl sheet 14, with the backing sheet 15 cut about tape 16. A curved inverted L-shaped molded rubber strip 17 is fitted along the perimeter of the vinyl top 10. Two metal security straps 18 each terminating in a hook 19 extend from the rear edge 32, cover 10 for hooking under the trunk lid 33 of the automobile 11. These straps 18 and hooks 19 fit between the main body of the automobile 11 and hinged edge of trunk lid 33, and act to prevent theft of the cover 10, when installed. A metal security band 21 is secured to the underside of the front edge 35 of the vinyl auto top cover 10 which extends past each side of the cover and terminates in a hook 23 at each end that may be clamped onto the inside of the roof structure under a top edge of window 24. As shown in FIG. 5 hook 23 is formed with prongs 27 that may be engaged by a strap lock 25, secured by a strap 26 to the underside of the interior roof structure of the automobile 10.

Additional metal bands 22 of similar construction to metal band 21 may be fastened to the underside of cover 10 as required for security purposes.

The cover 10 is cut out to fit about rear window 13 of the automobile as shown in FIGS. 1–2.

Primary retention of the cover 10 on the roof 31 of an automobile is by the magnetic attraction of magnetic tape 16 to the steel roof 31, with the security straps 21 and 22 serving as means of preventing theft of an installed cover.

The external vinyl layer 14 of cover 10 may be fabricated in any one of several colors with embossing to simulate the appearance of leather or fabric. Covers of different colors and lengths may be interchanged on a given automobile to vary the automobile appearance.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An automobile roof cover formed of a composite structure of an exterior sheet of vinyl plastic material bonded to a soft undercover material with strapping fastened to the underside of the roof cover, said strapping having magnetic attraction characteristics for fastening the cover to the steel roof of an automobile.

2. The combination as recited in claim 1 in which security straps are fastened to the underside of the structure which extend beyond the perimeter of the sides of the cover, said straps being fitted at their free ends with means to fasten to the interior of an automobile on which the cover is installed.

3. The combination as recited in claim 1 together with a strap adaptable for fastening to the interior of an automobile, said strap being fitted with latching means for joining to the free end of a strap fastened to the cover unit.

* * * * *